United States Patent [19]
Alling et al.

[11] 3,900,235
[45] Aug. 19, 1975

[54] TAB RACE
[75] Inventors: Richard L. Alling; Roger L. Iffland, both of Torrington, Conn.
[73] Assignee: The Torrington Company, Torrington, Conn.
[22] Filed: Mar. 4, 1974
[21] Appl. No.: 448,006

Related U.S. Application Data
[63] Continuation-in-part of Ser. No. 214,260, Dec. 10, 1971, Pat. No. 3,713,713, and a continuation of Ser. No. 304,961, Nov. 1, 1972, abandoned.

[52] U.S. Cl............................. 308/235; 308/187.2
[51] Int. Cl.² ....................................... F16C 33/58
[58] Field of Search ............ 308/217, 218, 235, 236

[56] References Cited
UNITED STATES PATENTS
3,439,965  4/1969  Kleinschmidt .................. 308/187.2
3,713,713  1/1973  Alling et al. ......................... 308/235

Primary Examiner—M. Henson Wood, Jr.
Assistant Examiner—Richard A. Bertsch
Attorney, Agent, or Firm—Frank S. Troidl

[57]  ABSTRACT
A bearing race is disclosed which employs tabs to retain the cage assembly. The structure of the tabs facilitate assembly and provide improved retention of the assembly. Cut-outs in the flange may be provided to improve lubrication and provide clearance at assembly.

6 Claims, 12 Drawing Figures

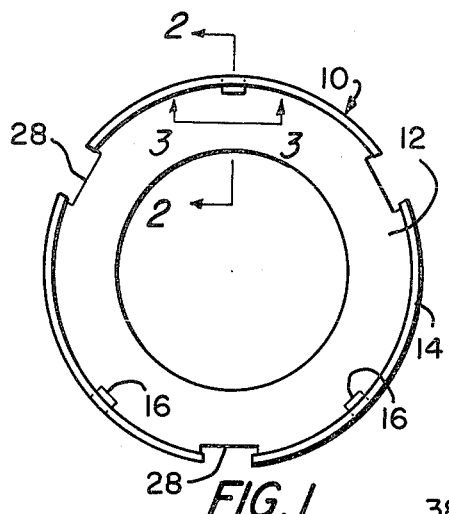
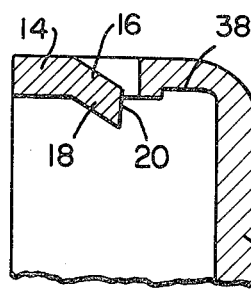
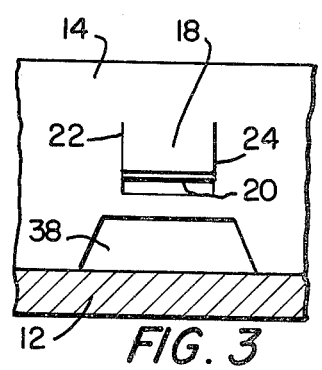
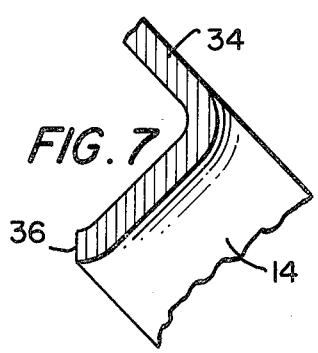
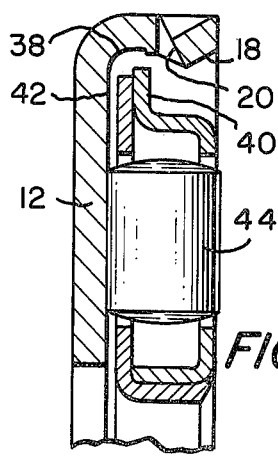
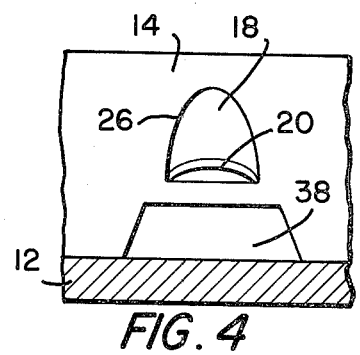
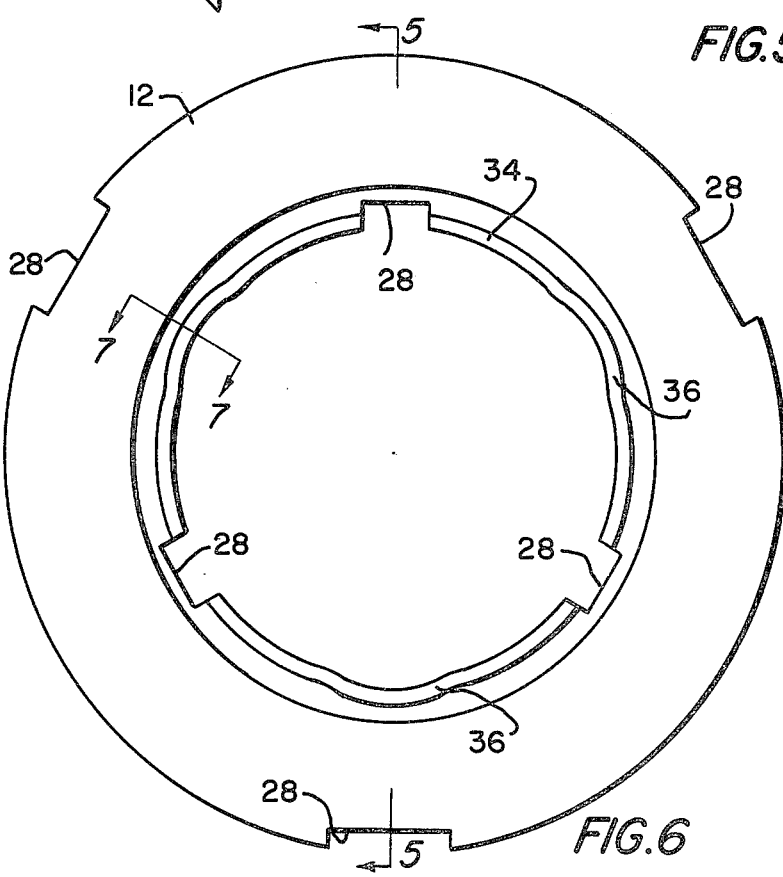
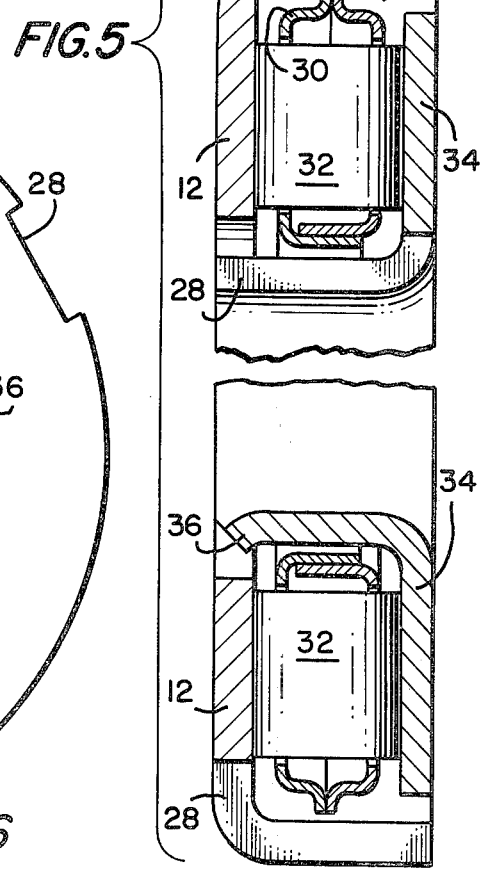

TAB RACE

This is a continuation-in-part of application Ser. No. 214,260, filed Dec. 10, 1971, now U.S. Pat. No. 3,713,713, and a continuation of application Ser. No. 304,961, filed Nov. 1, 1972, now abandoned.

This invention relates to bearings. More particularly, this invention is a new and improved bearing race wherein tabs insure smoother assembly and improved retention of the cages.

The conventional bearing has a cage and roller assembly positioned between two raceways. Typically, the assembly is held together by a peripheral band as shown in U.S. Pat. No. 2,891,828 issued to Winchell. The cap or banded configuration, besides requiring an extra part and forming operation, interferes with flow of lubricant to and from the rollers, races, and the piloting surfaces. Alternatively, the raceways may be complementary L-Shapes when viewed in cross section with projections from the edges of the flange of each raceway restraining axial movement of the cage from the race. The complementary L-shaped raceways having flanges and projections thereon, require more force to assemble than to disassemble the bearing, and frequently cause separation of the laminated-type cage during snap-in installation.

Our invention provides axial retaining means for the roller-cage assembly within the formed flange of the bearing that is more secure than the conventional projections, yet easier to assemble. It eliminates the requirement for a special component (outer banding cup) by combining the functions of axial retention and radial bearing guidance into the formed flange. Furthermore, it improves lubricant circulation through the bearing assembly by elimination of the banding cup and by the addition of slots in the flange. The spot staked flange edges or bent sections on flange edges known to prior art made it difficult to assemble the roller and cage assembly since the sharp angled portion is directed outwardly and resists installation while the gentle sloped portion detracts from its retentive ability. Conversely, our tab has its sharp projection inward which permits easy installation and contributes improved retention. This is analogous to having the barb of a fish hook hold the fish on the point rather than resisting his effort to get caught.

The invention as well as its many advantages may be further understood by reference to the following detailed description and drawings in which:

FIG. 1 is an elevational view of a thrust bearing race;

FIG. 2 is a partial section of a lanced tab taken along section 2—2, of FIG. 1.

FIG. 3 is a partial section of a thrust bearing race taken along line 3—3 of FIG. 2 showing the lanced tab;

FIG. 4 is an alternate embodiment of the lanced tab illustrated in FIG. 3;

FIG. 5 is a section of a thrust bearing assembly comprising a cage and rollers mounted in a thrust race with the lanced tab of FIG. 3 and a second opposed race;

FIG. 6 is an elevational view of the second opposed race flange end and back side surface of the race of FIG. 1;

FIG. 7 is a partial section of the opposed race taken along line 7—7 of FIG. 6.

FIG. 8 is a partial section of an asymmetrical cage and a singel race with the lanced tab of FIG. 4.

Like parts throughout the various views are referred to by like numbers.

Figure 9:
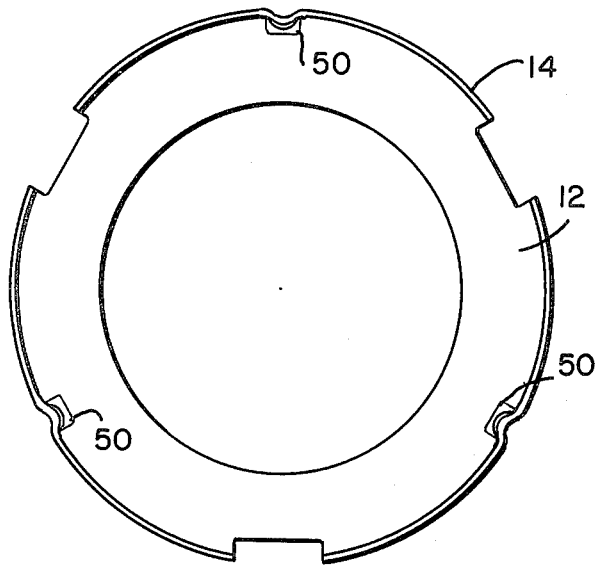
FIG. 9 is an elevational view illustrating another embodiment of the tab used on a thrust bearing race.

Referring to the drawings and particularly to FIG. 1, the thrust bearing race, indicated generally by 10, comprises a raceway 12 with an integral flange 14. The flange is lanced at at least one, but preferably at a plurality of locations, to form an inwardly directed tab configuration 16. The enlarged section of FIG. 2 clearly shows that the tab has a ramp face 18 along which a cage to be inserted may readily slide, and a retaining edge 20 which effectively restrains the cage from withdrawal or axial separation.

The flange 14 may be lanced with three cuts 20, 22, and 24 to form a square-shaped tab as illustrated in FIG. 3. However, it has been found that when the flange 14 is short, this configuration is conducive to cracks which propagate to the edge of the flange and may result in tabs breaking off. In such circumstances, an alternative tab configuration has been found satisfactory wherein the single lance 20 is made and an arcuate tab 26 is formed as illustrated in FIG. 4.

The flange may be continuous around the periphery of the race or it may be provided with cut-outs 28 as shown in FIG. 1 to facilitate machine assembly of the other elements of the thrust bearing to provide lubrication ports or to accommodate assembly past obstructions. Three tabs are usually provided and may be spaced 120° apart or asymmetrically for easier installation of the cage as described below.

This thrust bearing may comprise the lanced race 10, a cage 30, and rolling members 32 with or without an opposed race 34 as illustrated in FIG. 5. Flange edges of races can extend beyond opposing races or be flush with opposing race abutting surface. When the opposed race is included, it may be provided with conventional retaining projections 36 by which it is snapped onto the inner edge of the cage to retain it with the bearing assembly. However, lanced tabs of both configurations as illustrated in FIGS. 3 and 4 can be used on this opposed race.

FIG. 6 shows the cut outs in the race flanges, and FIG. 7 shows a conventional retaining projection on an inner race in partial section. FIG. 8 illustrates an embodiment in which the outer flange 40 of the cage has been offset toward the single race face 42. This permits a design in which the single race flange does not extend beyond the exposed face 44 of the thrust assembly roller.

It has been found that during forming of the lanced tab race it is often preferable to coin the area 38 between the tab and the raceway to thin the flange. If the coining operation is omitted, the flange fillet radius tends to bind the cage edge and interfere with its rotation.

Figure 10:
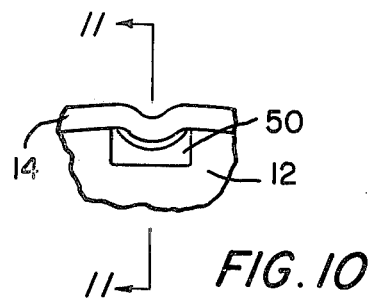
FIG. 10 is a fragmentary view of FIG. 9 on an enlarged scale, showing the tab and relief hole of the thrust bearing race of FIG. 9.
Figure 11:
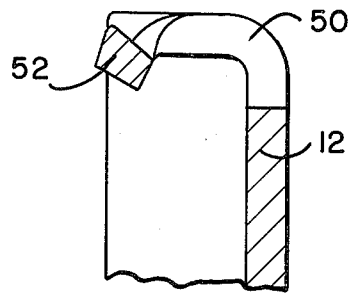
FIG. 11 is a view taken along lines 11—11 of FIG. 10

FIGS. 9 through FIG. 11 illustrate a further embodiment of our new bearing race used as part of a thrust bearing assembly. In this embodiment, a relief hole 50 is provided in the flange 14. The relief hole is preferably located in the flange at a point adjacent to and behind the tabs 52. As clearly shown in FIG. 11. each relief hole may extend from the tab 52 along the entire length of the flange 14 and then radially for a short distance into the radially extending portion 12 of the bearing race. Relief holes 50 perform a function similar to coined areas 38 of the other embodiments. The thrust bearing race of FIGS. 9 through FIG. 11 may be used with a second race similar to race 34 shown in the embodiment of FIG. 5.

Figure 12:
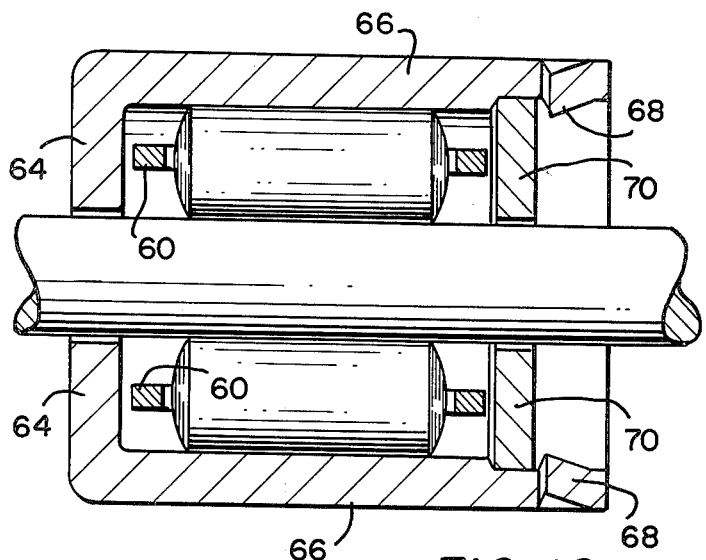
FIG. 12 is a view, partly in section, showing the new bearing race in a radial bearing assembly.

Our new bearing race may also be used to provide a new radial bearing assembly. One embodiment of a radial bearing assembly is shown in FIG. 12. The radial bearing assembly includes a cage 60 and rolling elements such as roller bearings 62. The radial bearing race includes a radially extending portion 64 which is integral with a flange 66 projecting axially from the outer diameter of the radially extending portion. The inside of flange 66 serves as a raceway for the rolling elements 62. Tabs 68 provided on the flange 66 extend inwardly and axially toward the axis of the radially extending portion 64. Annular retainer 70 along with the tabs 68 limit axial movement of the cage and rollers.

To assemble the thrust bearings, the cage and rolling element assembly is inserted under the retaining edge of two tabs and the free edge of the cage is then pressed along the ramp of the remaining tab until the assembly snaps into place under the retaining edge of the third tab. The cage is then securely in place and free to rotate. The second opposed race is then inserted by snapping it over the inner edge of the cage.

To assemble the radial bearing of FIG. 12, the cage and rolling element assembly is inserted in the bearing race. Then the retainer is inserted under the retaining edges of the tabs.

We claim:

1. A bearing race comprising:
   a radially extending portion;
   a flange integral with and projecting axially from the outer diameter of the radially extending portion; and at least one tab projecting from the flange inwardly and axially toward the axis of the radially extending portion said flange being provided with a relief hole adjacent to and behind each tab.

2. The bearing race of claim 1 wherein three tabs are unequally spaced around the flange.

3. The bearing race of claim 1 wherein the tab projects from the free edge of the flange.

4. A bearing race in accordance with claim 1 wherein said relief hole extends from the tab along the entire length of the flange and then radially into the radially extending portion.

5. A bearing assembly having a cage, rolling elements, a bearing race comprising a radially extending portion, a flange integral with and projecting axially from the outer diameter of the radially extending portion, and at least one tab projecting from the flange inwardly and axially toward the axis of the radially extending portion, said flange being provided with a relief hole adjacent to and behind each tab.

6. A bearing assembly in accordance with claim 5 wherein said relief hole extends from the tab along the entire length of the flange and then radially into the radially extending portion.

* * * * *